United States Patent
Longtin et al.

(10) Patent No.: US 7,272,635 B1
(45) Date of Patent: Sep. 18, 2007

(54) METHOD OF CONFIGURING AND MANAGING A NETWORK

(75) Inventors: Pierre Longtin, St-Pierre Île d'Orleans (CA); Steve Baril, St-Elzéar (CA); Patrick Vachon, Québec (CA); Martin Pilote, Les Saules (CA)

(73) Assignee: Domosys Corporation, Quebec (CA)

( * ) Notice: Subject to any disclaimer, the term of this patent is extended or adjusted under 35 U.S.C. 154(b) by 587 days.

(21) Appl. No.: 10/264,784

(22) Filed: Oct. 4, 2002

(51) Int. Cl.
*G06F 15/16* (2006.01)

(52) U.S. Cl. ............ 709/208; 709/209; 709/227; 370/222

(58) Field of Classification Search ......... 709/208, 709/209, 227; 370/222
See application file for complete search history.

(56) References Cited

U.S. PATENT DOCUMENTS

| | | | |
|---|---|---|---|
| 5,844,900 A * | 12/1998 | Hong et al. ............ | 370/342 |
| 6,094,416 A * | 7/2000 | Ying ..................... | 370/222 |
| 6,147,967 A * | 11/2000 | Ying et al. ............. | 370/222 |
| 6,195,687 B1 * | 2/2001 | Greaves et al. ......... | 709/208 |
| 6,633,538 B1 * | 10/2003 | Tanaka et al. .......... | 370/222 |
| 6,675,199 B1 * | 1/2004 | Mohammed et al. ..... | 709/208 |
| 6,697,845 B1 * | 2/2004 | Andrews ................ | 709/209 |
| 6,854,053 B2 * | 2/2005 | Burkhardt et al. ....... | 713/2 |
| 6,865,596 B1 * | 3/2005 | Barber et al. ........... | 709/208 |
| 6,915,346 B1 * | 7/2005 | Kato et al. .............. | 709/227 |

OTHER PUBLICATIONS

Tranmit, Anwers.com, Online Dictionary, pp. 1-5.*

* cited by examiner

*Primary Examiner*—Zarni Maung
*Assistant Examiner*—Saket K Daftuar
(74) *Attorney, Agent, or Firm*—Bourque and Associates

(57) ABSTRACT

The network comprises a master node and a plurality of slave nodes. To configure the network, the master node transmits over the network a hailing message at any attenuated level compared to normal communication signals to be transmitted over the network. Upon receiving the hailing message at one of the slave node, a reply message is transmitted, also at an attenuated level. Receiving the reply message at the master node allows it to configure the slave node from which the reply message originated. Also disclosed are a method of managing a network so as to monitor the connections between the slave nodes, and a method of managing a network when a recovery operation is required.

14 Claims, 6 Drawing Sheets

| Node | Reaching Area | Router | Leaf Node |
|------|---------------|--------|-----------|
| A | 0 | - | NO |
| B | 0 | - | YES |
| C | 1 | A | NO |
| D | 2 | A-C | YES |

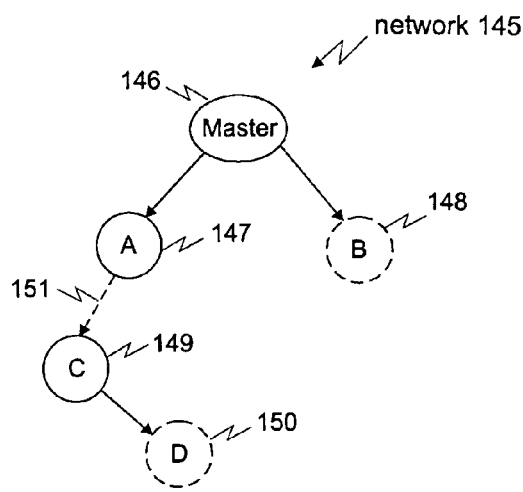
FIGURE 4c
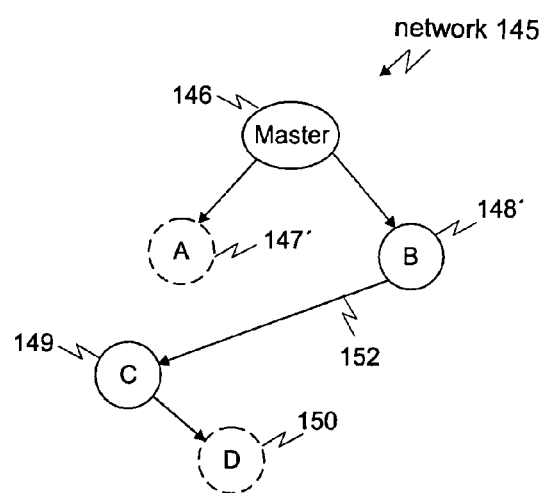
FIGURE 4d
| Node | Reaching Area | Router | Leaf Node |
|------|---------------|--------|-----------|
| A | 0 | - | YES |
| B | 0 | - | NO |
| C | 1 | B | NO |
| D | 2 | B-C | YES |
FIGURE 4e

METHOD OF CONFIGURING AND MANAGING A NETWORK

BACKGROUND

Wherever there exists a network of one or more nodes, the primary issue is that of communication between the nodes. In a large network of the type having a master node and a plurality of slave nodes, it is often difficult for the master node to relay a message to every slave nodes because of location or signal attenuation due to noise or poor network conditions. For example, reliable communication is vital in control networking environment using pre-existing power lines. A major problem with power line communications is the hostile medium itself. Transmission of signals through this medium results typically in reception of severely attenuated signals (e.g. 100 decibels). The master node must resort to using other nodes to route messages to the rest of the slave nodes that could be located in far remote areas or in areas of high signal attenuation. Optimal signal path routing is essential to achieve reliable and fast communication.

There are many examples of network systems in the prior art. However, many prior systems have limitations resulting from the method of router node selection. This often depends on either prior knowledge of the network, i.e. the nodes have already been configured to the network and the master node has a pre-recorded list of devices, or the selection is random if the master node does not have previous knowledge of the network. Random selection of the routers takes more time and there is no test to ensure the robustness of the router, especially during periods of high signal attenuation. As a result, a routing path that may be valid during node configuration may not be valid all the time. It may be necessary to look for alternate routing paths when network conditions are poor.

SUMMARY

It is an object of the present invention to provide a method of configuring and managing a network so as to allow efficient communication between a master node and slave nodes with minimum delay, and in light of varying conditions of the medium.

In a first aspect of the present invention, the master node initiates a hailing process wherein all slave nodes are required to respond. This hailing process constitutes a request and is made at a forced attenuated signal. If a slave node is able to receive this forced attenuated signal, it will be able to receive transmissions at one hundred percent signal strength. This ensures the node's communication reliability. Due to noise and distance limitations, not all slave nodes acknowledge the hailing. The slave nodes that do respond (also at an attenuated level) are configured and form the master node's reaching level. Advantageously, the master node subsequently passes the hailing process one at a time to these configured slave nodes and then these slave nodes act as routers and continue to transmit the hailing process (at an attenuated level) on behalf of the master node. The responses these configured slave nodes receive pass to the master node so the master node can configure the slave nodes that responded to the second round of the hailing process. These newly configured slave nodes from the second round of hailing become routed to the master node by the slave nodes that hailed for them. This preferably continues until there are no more responses resulting from the hailing process. By the end of the process, not only has the master node configured all the slave nodes in its network, but has also built a routing table and knows which router nodes to access when trying to communicate with slave nodes outside of its reaching level.

In a second aspect of the present invention, the master node continuously monitor all of the nodes in the network to ensure their functionality and the functionality of the routing paths joining them. Requesting continuous updates of each node however, is time consuming and inefficient. To this end, the master node preferably pings only the leaf slave nodes of the network. The master node sends a ping message at an attenuated signal level. Because intermediate slave nodes, if any, have to be accessed when reaching leaf nodes, testing the leaf nodes also allow to test the communication of all the slave nodes in the network. Advantageously, this ping process occurs when the master node is in an idle state.

A further aspect of the present invention is the recovery in case of a slave node becoming out of service, for instance if the slave node itself cease to operate or if the communication link is no longer working for any reason. In this case, the master node tries to select an alternate route since the slave node may only be out of reach because of a communication problem, such as high noise. Preferably, the master node initially contacts the slave nodes that are part of the same reaching level as the de-routed node. These nodes in turn attempt to communicate with the de-routed node, one by one, at an attenuated level similar to the attenuated level used for the hailing process. If no router nodes are found within the same reaching level as the de-routed node, the master node will ask those nodes in the first reaching level (level 0). After each node in this reaching level has attempted communication and if none were successful in communicating with the de-routed node, the master node passes the request to the next reaching level (level 1). This process continues until a router node is found.

BRIEF DESCRIPTION OF THE FIGURES

Other aspects and advantages of the invention will become more fully apparent from the following detailed description and appended claims, taken in conjunction with the accompanying figures. The figures are for the purpose of illustration and are therefore not to be considered limiting of its scope. The figures depict one of many embodiments wherein:

FIG. 4*c* is a view similar to FIG. 4*a*, but illustrating a broken routing path between two of the slave nodes;

FIG. 4d shows a new routing path to resolve the broken path of FIG. 4b; and

FIG. 4e shows a simplified diagram of a routing table for the network of FIG. 4d.

DETAILED DESCRIPTION

Network Configuration

Figure 1A:
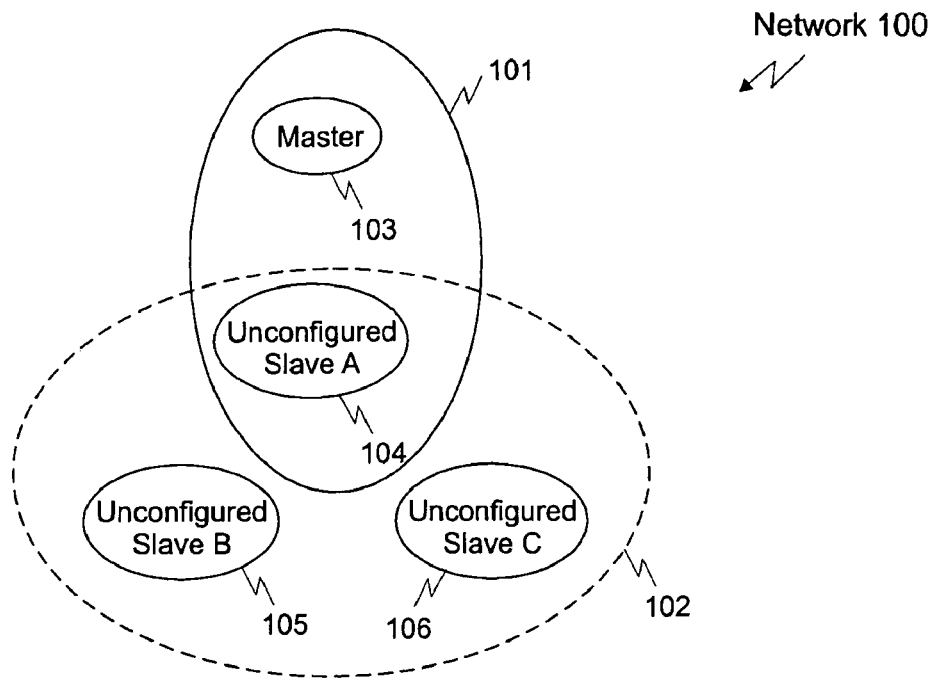
FIG. 1*a* shows an example of a network consisting of a master node and three unconfigured slave nodes residing in two reaching levels.

FIG. 1a depicts an example of a network (100) outlining one embodiment of the present invention. This network (100) contains a master node (103) and three unconfigured slave nodes A (104), B (105) and C (106). These could be, for example, devices interconnected by means of a power line. Ellipse (101) represents the reaching level of the master node (103) and unconfigured node A (104). Ellipse (102) represents the reaching level of unconfigured nodes B and C, respectively (105) and (106). In this particular example, the nodes in the same ellipse have less than a given level of attenuation between them. In this case, messages can be transmitted and received without a great deal of information loss. No router is necessary, therefore. The ellipse (101) that contains the master node (103) represents level 0 of routing. This means that the master node (103) can reach all of the nodes within ellipse (101) without signal reduction. Ellipse (102) represents level 1 of routing due to the distance between slave nodes A (105), B (106) and the master node (103). Direct communication between the slave nodes A (104), B (105) and master node (103) is almost impossible due to the fact that these nodes reside in different ellipses.

The first step in network configuration is known as the hailing process. The master node (103) transmits (broadcasts) a request at an intentionally attenuated level for all the unconfigured slave nodes (104) to (106) to acknowledge themselves. If an unconfigured slave node is able to receive an attenuated signal than it should also be able to receive signals transmitted not only at 100% signal strength from the master node (103), but also with signal attenuation along the path due to noise and poor network conditions. When a slave node receives a hailing message, it sends a reply message to the master node (103). The reply message is sent at an intentionally attenuated level and contains information on the identity of the slave node. When the master node (103) can receive the attenuated response from the slave node, it strengthens the master node's decision in selecting the node as router nodes. From the responses, the master node (103) has a preliminary list of the unconfigured slave nodes and thus has knowledge of which slave nodes have to be configured to the network. In this present example, however, only the unconfigured node A (104) can respond because it is the only unconfigured node within the master node's (103) reaching level (101).

In order to improve efficiency the master node (103) can be provided with pre-recorded information concerning the slave nodes. The master node (103) then proceeds with the configuration process of all the slave nodes in its unconfigured device list.

Figure 1B:
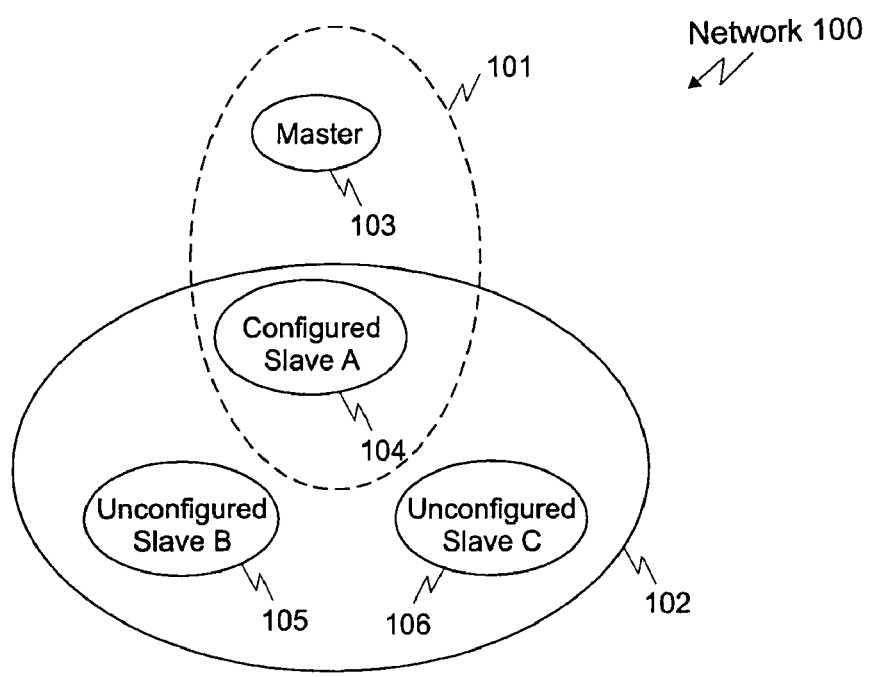
FIG. 1*b* is a view similar to FIG. 1*a*, showing the master node after having configured a slave node to the network and requesting this configured slave node to hail the unconfigured slave nodes.

FIG. 1b continues with the haling example of FIG. 1a, but with unconfigured slave node A (104) now becoming configured slave node (104'). Once all of the unconfigured slave nodes in the master node's (103) reaching level (101) have completed the configuration process, the master node (103) passes the hailing process to each of these configured slave nodes. Due to the large amount of attenuation, the master node (103) does not have a clear idea of the location of the other unconfigured salve nodes. It is for this reason that the master node (103) passes the hailing process in turn to all of the configured slave nodes within its reaching level.

In FIG. 1b, configured slave nodes (104') receives the hailing process from master node (103) in the form of an instruction message and then resumes the process of hailing the unconfigured slave nodes. Preferably, the hailing message sent by configured slave node (104') includes information on the origin of the message, namely, the master node (103). This is contained in an appropriate filed in the packet sent by slave node (104'). As a result, the unconfigured slave nodes that are able to receive the hailing message from configured slave node (104') have knowledge of the original sender of the request. Due to its location in both ellipse (101) and ellipse (102), configured slave node (104') is not only within the reaching level of master node (103), but also within reach of unconfigured slave nodes B and C (105), (106). These two unconfigured slave nodes (105), (106) send a reply message, at any attenuated level, to configured slave node A (104').

Once a reply message is received at configured slave node A (104'), a post-reply message is sent to the master node (103). This post-reply message is preferably at full strength since the communication with the master node (103) has already been established. The post-reply message is either a new message sent by the configured slave node A (104') or a routed reply message received from an unconfigured slave node. With the responses from the unconfigured slave nodes (105), (106), the master node (103) is now aware that future messages to these slave nodes should route through slave node A (104'). In the same fashion, all of the slave nodes within ellipse (102) know that the path to the master node (103) is via slave node A (104') because the hailing process was routed from this slave node at the request of the master node (103). Now having the identity of two more unconfigured slave nodes, the master node (103) halts the hailing process again and configures both slave nodes B and C (105), (106) one at a time, to the network. Once all slave nodes within the next routing level are configured, the master node (103) passes the hailing process to a next slave node. Slave node A (104') passes this hailing process one at a time to all of the now configured slave nodes within its reaching level, namely slave nodes B and C (105), (106). These slave nodes continue the process and send out a request for acknowledgement from all the unconfigured slave nodes within their reaching level. In this example, slave nodes B and C (105), (106) receive no response. This information can be passed to the master node (103) via slave node (104'). A given time can also be allocated to each node for completing the hailing process. In receiving no more responses from unconfigured slave nodes, the master node (103) knows that there are no more reachable unconfigured slave nodes left on the network.

The above example outlined the automatic unconfigured slave node detection. The master node (103) can pass the hailing process to all of its configured slave nodes within its reaching level one by one until an unconfigured slave node is found. When the master node (103) does find one, the hailing process stops until the master node configures the slave node to the network. However, the unconfigured slave node detection can also be done manually. For instance, if the user knows the network topology and the reaching levels, the user can pass the hailing process to a particular slave node and override the automatic unconfigured slave node detection.

For large amounts of slave nodes on a network, it's often easier and more efficient to configure the slave nodes at the manufacturer level instead of configuring them in the field. The configuration at the manufacturer level can include built-in routing tables for the master node (103) and the router nodes. This is useful when the network topology is known before the installation. One example is that of streetlights, where a plurality of streetlights can be grouped together by their location. If this location information is available as early as the manufacturing stage, it is more time efficient to configure them at that time. The list of pre-configured slave nodes would then be added to the master node's list. As a result, the master node (103) has a predetermined list of configured nodes and has only to determine routing paths for all these slave nodes. By pinging each slave node in its list and determining if each communication attempt was a success or failure, the master node (103) can decide which slave nodes it can communicate with directly and which slave nodes would require a router. From this information, the master node (103) can update its routing table. No hailing process is necessary in that case.

Figure 2:
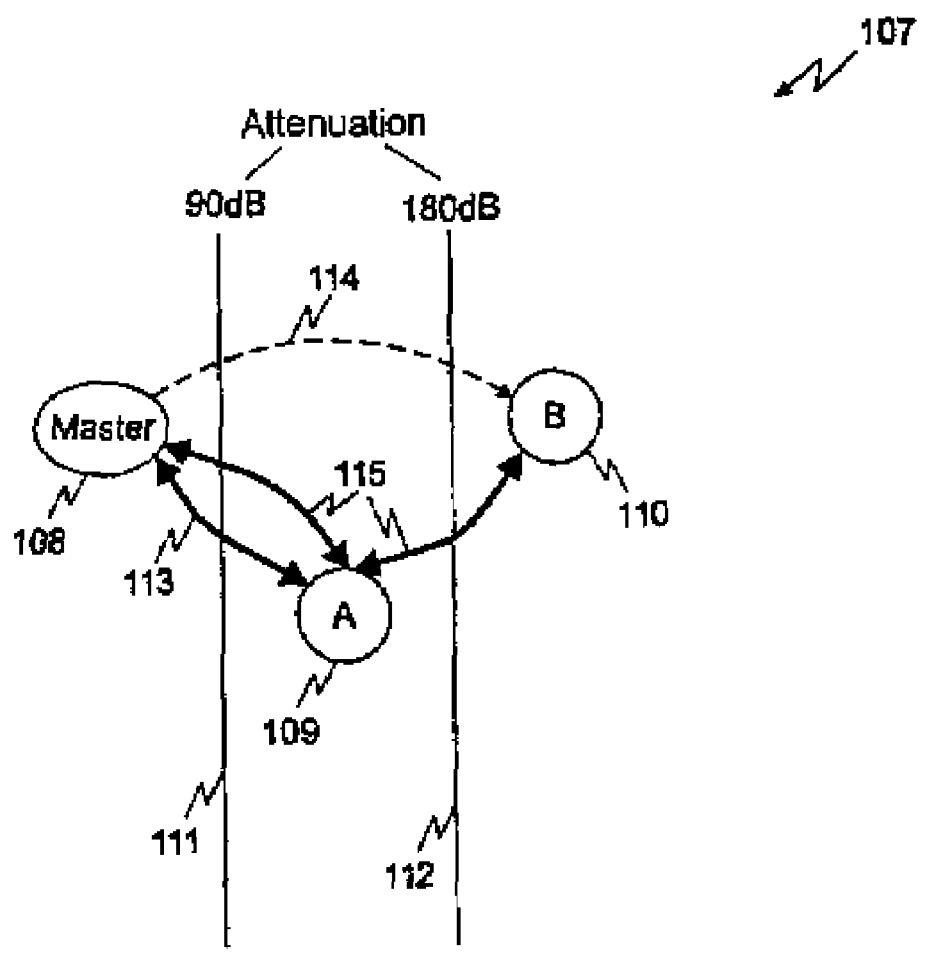
FIG. 2 shows an example of a network consisting of a master node and two pre-configured slave nodes located in different signal attenuation environments.

FIG. 2 illustrates another example. It shows a simple network (107) consisting of a master node (108) and two pre-configured nodes A and B (109), (110). Slave node A (109) is in a reaching level where there are less than 90 decibels (or low noise) (111) of attenuation between it and the master node (108). Slave node B (110) is in a reaching level where there are 180 decibels (or high noise) (112) of attenuation between it and the master node (108). The master node (108) has each of these slave nodes in its routing table and attempts to ping (with an attenuated signal) each of these slave nodes directly. The master node's communication attempt (113) with slave node A (109) is successful and no routing is required. The communication attempt (114) with slave node B (110) by the master node (108) is unsuccessful because of the high amount of attenuation or noise. The master node (108) then selects node A (109) as a router and to achieve successful communication (115) with node B (110). The master node (108) adds node A (109) as a router for node B (110) in its routing table.

Normal Operation

Figure 3A:
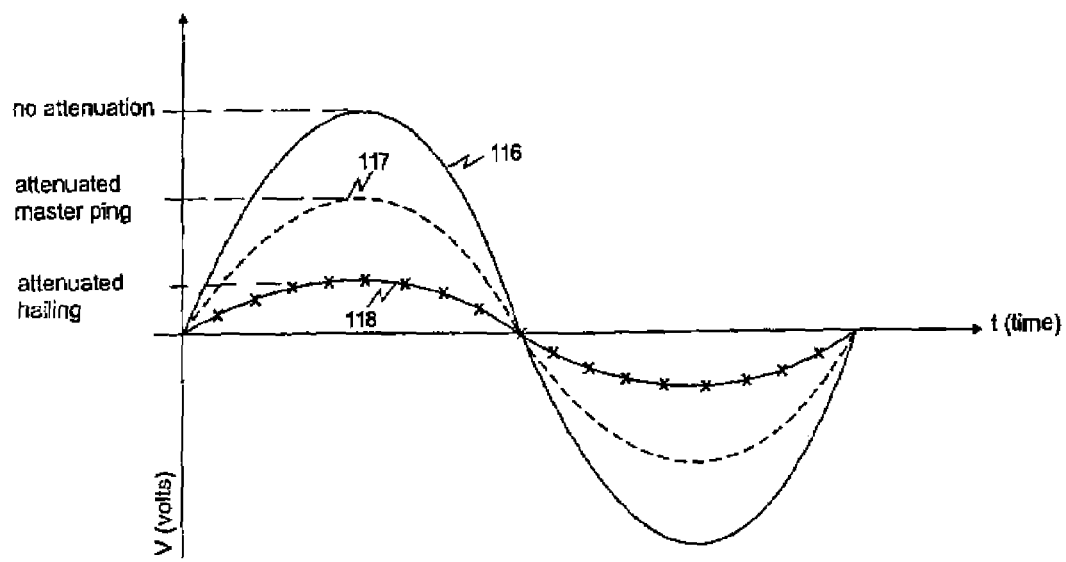
FIG. 3*a* shows examples of the differences between the signal level of a message signal used in normal communication and attenuated signals used for pinging and hailing.

The goal of the master/slave topology is to maintain communication reliability between the master and all of the slave nodes in the network. In order to achieve this, the master node preferably performs a background process known as "master ping". The master ping is a forced attenuated request to a slave node that requires a response from the slave node. This forced attenuated signal preferably has a variable range between the attenuated signal level during node configuration (hailing process) and normal operation (no attenuation). In the preferred embodiment, the attenuated master ping has a level at the midpoint between the level of the attenuated hailing signal and the non-attenuated signal during normal operation. More preferably, the attenuated hailing signal level varies between 25% to 50% of the non-attenuated signal and the attenuated master ping signal varies between 50% to 75%. FIG. 3a shows a comparison of the three signal levels of the preferred embodiment of the present invention. Curve (116) represents the signal level during normal operation. This signal is at full strength, i.e. zero signal attenuation. Curve (118) represents the attenuated hailing signal and curve (117) represents the signal level during the master ping process and this level is usually at the midpoint between curves (118) and (116). Using attenuated signals ensures that if communication is possible at attenuated levels, communication is almost guaranteed during normal operation.

The master ping process tests the functionality of all the routing paths by sending ping messages. The master node preferably executes this process when it is in an idle state. It then halts the process immediately after a slave node begins running an application and requires the master node's services. To make the process more efficient, the master node preferably only pings the leaf nodes, i.e. the nodes that are at the end of a branch and are thus only directly connected to one other node. In pinging only the leaves of a network, all of the intermediate nodes need to be accessed and are thus indirectly tested as well. Leaf nodes that respond and any intermediate node that transmit a response are re-validated.

In use, due to all the activity on the network, the master node never stays in an idle state for very long. As stated earlier, the process preferably halts when a slave node runs an application and requires the master node. In attending to the slave node however, the master node can also update its routing table. If it is a leaf node that requires assistance, the intermediate nodes are tested too. The goal of having a continuously updated routing table is achievable by using the master ping process and indirectly through regular master/slave node communication.

Figure 3B:
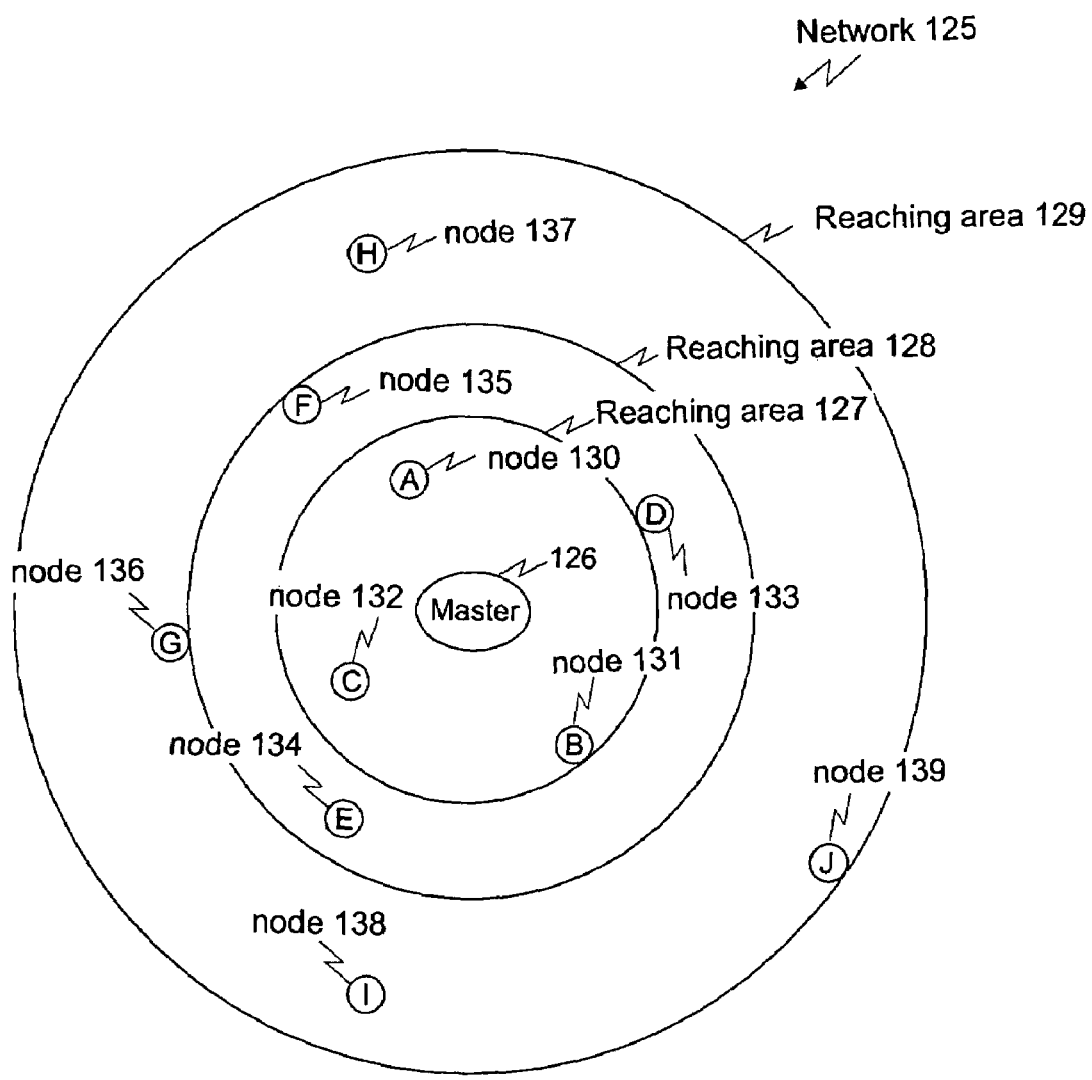
FIG. 3*b* schematically illustrates the reaching area of three attenuation levels in a network consisting of a master node and a plurality of slave nodes.

FIG. 3b schematically illustrates an example of the reaching area of the three attenuation levels in a network (125) consisting of a master node (126) and ten slave nodes, A to J, (130) to (139). Master node (126) has three reaching areas (127, 128 and 129) defined as concentric rings around node (126) collectively encompassing slave nodes A to J. Nodes A, B and C are in ring 127; nodes D, E and F are in ring 128; and nodes G, H, I and J are in ring 129. Each successive ring (128 and 129) has more attenuation of received signals than its neighbouring smaller ring. During the initial hailing process, nodes A (130), B (131) and C (132) were able to correctly receive the master node's (126) attenuated request at a signal strength given by curve (118) of FIG. 3a. As a result, the master node's (126) configuration reaching area (127) is defined by the area encompassing nodes A (130), B (131) and C (132). During the master ping process, the master node (126) still pings nodes A (130) to C (132) at an attenuated level given by curve (117). The packet that the master node (126) sends onto the communication medium preferably contains only a minimum number of bytes in order to test all the leaf nodes as quickly as possible. Also, a smaller packet has less chance of corruption by the medium. In other words, if a small packet with a forced medium attenuation as shown in curve (117) can reach a slave node properly, proper connection should result with this slave node for a long packet with an amplitude shown in curve (116) of FIG. 3a.

During the master ping process, nodes A (130) through C (132) are able to acknowledge the master node's (126) pinging. The master ping reaching area is still the same as the hailing process (118) therefore it encompasses slave nodes A (130) through C (132). During normal operation when the master node transmits at full signal strength as shown in curve (116), all nodes of network (125) are able to receive the master node's message, but use the routing path set by the hailing process to ensure a maximum connectivity. It should be noted that reaching areas aren't necessarily dependent on physical distance, but of other factors as well including noise variations, traffic concentrations, etc.

Figures 4A, 4B:
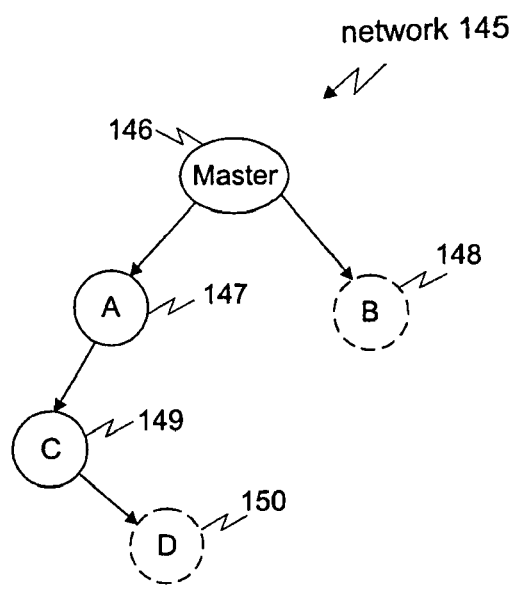
FIG. 4*a* shows an example of a network with router nodes and leaf nodes.
FIG. 4*b* shows a simplified diagram of a routing table for the network of FIG. 4*a*.

FIG. 4a shows an example of a network (145) that consists of a master node (146) and four slave nodes, A through D (147)-(150). Of these nodes, A (147) and C (149) are intermediate nodes and nodes B (148) and D (150) are leaf nodes. During the master ping process, the master node (146) pings only the leaf nodes, B and D (148), (150). In order to reach node D (150), the paths via node A (147) and node C (149) are indirectly tested as well. The master node's (146) routing table is given in FIG. 4b. From this table, the master node (146) has knowledge of each node's reaching area, the official routers to reach a particular node and whether a node is a leaf node or not. From the information gathered in this table, the master node (146) knows that node A (147) is in its own reaching area, level 0. As a result it does not require a router, but it is used as a router since it is not a leaf node. Node B (148) is also in reaching area 0, but it is a leaf node and therefore not presently a router node. Node C (149) is in reaching area 1, and as a result requires a router. Node A (147) is listed as a router node for communication between the master node (146) and node C (149). It is not a leaf node, therefore it is a router for another node. Node D (150) is in reaching area 2 and as a result requires more than one router. Nodes A (147) and C (149) are both router nodes for node D (150). It is also a leaf node. Using the results of FIG. 4b, the master node (146) can detect if a routing path is not working and search out alternate routes with minimum delay. As the master node (146) pings each leaf node, an internal timer starts. This timer lets the master node (146) know when a problem has occurred in attempting to reach a leaf node. As a master processor and controller, the master node has knowledge of the average delays between nodes. In pinging node B (148), the master node (146) sets the timer accordingly to account for the delay to node B (148) and back. When pinging node D (150), the ping is routed through two router nodes, node A (147) and node C (149). The addition of two routers increases the timer duration to three times that of leaf node B (148). The timer is then adjusted accordingly when the master node (146) pings node D (150).

Error Handling and Recovery

FIG. 4c depicts the same network as in FIG. 4a, except for the existence of a break in the path (151) between node A (147) and node C (149). The master node (146) can no longer communicate with nodes C (149) and D (150). Whether the problem lies with a faulty router or a faulty routing path, the last working router preferably generates an error message and forwards it to the master node. This error message advantageously contains the address of the possibly faulty router. In the example of FIG. 4c, node A (147) builds an error message with node C's (149) address and forwards it to the master node (146). The master node (146) receives the error message and becomes aware that node C (149) is unreachable. When a routing path breaks down, the network cannot stop message exchange and wait until the fault is repaired. Alternate routing paths must be found immediately. The master node consults its routing table from FIG. 4b and finds another router to reach the node and re-establishes the connection. It is important to find a router that is able to properly route a message especially during those periods of time when the attenuation between the router and the slave node to be reached is very high. With this in mind, the master node transmits a recovery message as a request for all of the configured slave nodes within the same reaching level as the de-routed device to reach this slave node. When these configured slave nodes attempt to send a hailing message one at a time, with the de-routed slave node, they do so with an attenuated signal similar to the attenuated signal the master node transmits during the hailing process. The configured device that receives a response from the de-routed device becomes the new router node for this slave node. If the de-routed device is able to receive an attenuated signal then it should also be able to receive signals transmitted at 100% signal strength from the router, but with signal attenuation along the path due to noise and poor network conditions. If for any reason, none of the nodes within the reaching level of the de-routed slave node are able to establish communication therewith, the master node preferably contacts the configured nodes within the lowest level, namely level 0. If none of these nodes can establish contact, the master node will pass this request to the next level and continues to increment levels until a configured node is able to establish contact with the de-routed slave node, if possible.

In the example of FIG. 4c, the master node (146) tries to find an alternate routing path to communicate with node C (149) and node D (150). As described earlier, the master node (146) initially requests nodes within the same reaching area as the de-routed node to attempt communication. In this case, however, there are no other nodes in the same reaching area as node C (149). The next step is to send the request to nodes within the master node's (146) reaching area. The master node (146) begins with node A (147), but the slave node fails to reach it. The master node (146) then passes the request to node B (148). Node B (148) pings node C (149) at an attenuated level and the communication (152) is successful. Node B (148) informs the master node (146) that it is able to communicate directly with node C (149). From the information gathered, the master node (146) learns that node C (149) is operable, but the routing path between nodes A (147) and C (149) is faulty. The master node (146) then updates the information in its routing table and replaces node A (147) with node B (148) as a router for nodes C and D (149), (150). FIG. 4d shows the new routing path for the network (145). FIG. 4e reflects the master node's (146) updated routing table. Node A (147') is no longer a router, but is now a leaf node. Node B (148') is no longer a leaf node, but is now a router node for node C (149) along with node C (149), a router node for node D (150).

What is claimed is:

1. A method of identifying, in a network, a plurality of slave nodes for a master node, said master node configured to transmit a normal communication signal at a first transmission output level, the method comprising:

transmitting a first hailing message from the master node to the plurality of slave nodes, the hailing message being encoded in an analog hailing transmission signal and having a transmission output level that is attenuated compared to the normal communication signal from said master node transmitted over the network;

upon detection of receipt of the hailing message by at least one receiving slave node of the plurality of slave nodes, generating and transmitting a reply message from the receiving slave node that is intended for the master node, the reply message identifying the at least one receiving slave node and being encoded in an analog reply transmission signal having a reply transmission output level that is attenuated compared to the normal communication signal; and upon the master node receiving the reply message, then identifying the receiving slave node from the reply message and storing in a routing table information indicating that the receiving slave node is a first configured slave node capable of communicating with the master node at said reply transmission output level.

2. The method according to claim 1, further comprising:

attempting to hail remaining unconfigured slave nodes of said plurality of slave nodes by sending an instruction message from the master node to the configured slave node;

upon receiving the instruction message at the configured slave node, transmitting the second hailing message from the configured slave node, the second hailing message being encoded in an analog hailing transmission signal having a transmission output level that is attenuated compared to the normal communication signal output level;

upon receiving the second message at an unconfigured slave node of said remaining unconfigured slave nodes, transmitting by an unconfigured slave node of a reply message to the configured slave node, the reply message being transmitted at an attenuated level compared to the normal communication signal output level;

upon receiving the reply message at the configured slave node, transmitting a post-reply message to the master node containing details of the configured slave node and the unconfigured slave node;

upon receiving the post-reply message at the master node, analyzing the post-reply message to identify the unconfigured slave node and the configured slave node and updating the routing table to indicate that the unconfigured slave node is a second configured slave node capable of communicating with the master node through the first configured slave node; and after updating the routing table, configuring further messages from the master node destined for the second configured slave node to be sent through the first configured slave node.

3. The method according to claim 1, further comprising:
attempting to validate a connection between the master node and a leaf slave node in the network that is at an end of a communication branch from the master node by generating a ping message at the master node and transmitting the ping message towards the leaf node;

upon receiving the ping message at the leaf slave node, then transmitting a reply message from the leaf node to the master node; and upon not receiving by the master node of the reply within a time limit, then updating the routing table to indicate that the leaf slave node did not reply.

4. The method according to claim 3, wherein the reply message is transmitted at an attenuated signal level compared to the normal communication signal.

5. The method according to claim 4, wherein the ping message and the reply message are routed through an intermediary slave node in the branch.

6. The method according to claim 3, wherein the ping message is sent when the master node is in an idle state.

7. A method of recovering from a failure in a network having a master node and a plurality of slave nodes, the method comprising: maintaining a routing table containing information on interconnections among the plurality of slave nodes and reaching areas in the network for the plurality of slave nodes;

upon detection of a failure of a failed node of the plurality of nodes, utilizing the routing table to identify an upstream slave node in the plurality of slave nodes that normally transmits communications from the master node to the failing node, to determine a reaching area for the upstream slave node;

transmitting a recovery message to another slave node of the plurality of slave nodes that has a comparable reaching area to the upstream slave node, the recovery message instructing the another slave node to transmit a hailing message to the failed slave node, the hailing message being encoded in an analog hailing transmission signal having a hailing transmission output level that is attenuated compared to a normal communication signal transmitted over the network; and upon receiving the hailing message at the failed slave node, then: transmitting a reply message to the another slave node from the failed slave node, the reply message being transmitted at an attenuated level compared to the normal communication signal;

upon receiving the reply message at the another slave node, transmitting a post-reply message to the master node; and node receiving the post-reply message at the master node, identifying the failed slave node from which the reply message originated, identifying the another slave node from which the post-reply message originated and updating the routing table to indicate that the failed slave node is capable of communicating through the another slave node.

8. The method according to claim 7, wherein if the reply message is not received at the another slave node within a predetermined time period, then identifying a further slave node that has a comparable reaching area to the upstream slave node and transmitting the hailing message from the further slave node.

9. The method according to claim 8, wherein if the further slave node cannot be identified, then selecting a still further slave node in the network starting from a lowest level in the network and attempting to contact the failed slave node through the still further slave node.

10. The method according to claim 7, wherein the failure of the failed node is signified from an error message generated and sent by the upstream slave node to the master node.

11. The method according to claim 10, wherein the ping message is transmitted at an output level between the transmission output level of the attenuated hailing signal and the output level of the normal communication signal.

12. A master node for communicating with a a plurality of slave nodes over network, the master node comprising:
a transmitter configured to generate and transmit communication signals to said network, said signals having at least a first transmission output level and a second, lower transmission output level;

a receiver configured to receive said communication signals from said network;

a module to generate a normal communication signal to be transmitted from the transmitter at the first transmission output level;

a module to generate a hailing message to be transmitted from the transmitter to the plurality of slave nodes, the hailing message being encoded in an analog hailing transmission having a transmission output level at the second, lower output level that is attenuated compared to the normal communication signal;

a module to monitor for receipt of a reply message from a receiving slave node of the plurality of slave nodes that responds to any hailing message, the reply message being encoded in an analog reply transmission having a transmission output level that is attenuated compared to the normal communication signal; and a module to identify the receiving slave node from the reply message and to store in a routing table information indicating that the receiving slave node is a configured slave node capable of communicating with the master node.

13. The master node for communicating with a network a plurality of slave nodes as claimed in claim 12, wherein
the module to generate the hailing message;
attempts to hail remaining unconfigured nodes of said plurality of nodes by sending an instruction message from the master node to the configured slave node; and upon the master node receiving a second message at an unconfigured slave node of said remaining unconfigured nodes, generates a reply message for transmission to the configured slave node, the reply message being transmitted at an attenuated level compared to the normal communication signal; and the module to identify the receiving slave node from the reply message:

upon the master node receiving a post-reply message, analyzes the post-reply message to identify the unconfigured slave node and the configured slave node and updating the routing table to indicate that the unconfigured slave node is a newly configured slave node capable of communicating with the master node through the configured slave node; and after updating the routing table, configures further messages from the master node destined for the newly configured slave node to be sent through the configured slave node.

14. The master node for communicating with a network a plurality of slave nodes as claimed in claim 13, further comprising:

a routing table containing information on interconnections among the plurality of slave nodes and reaching areas in the network for the plurality of slave nodes;

a failure analysis module that upon detection of a failure of a failed node of the plurality of nodes:

a. utilizes the table to identify an upstream slave node in the plurality of nodes that normally transmits communications from the master node to the failing node and to determine a reaching area for the upstream slave node;

b. generates a recovery message for transmission to another slave node of the plurality of slave nodes that has a comparable reaching area to the upstream slave node, the recovery message instructing the another slave node to transmit a hailing message to the failed slave node, the hailing message having attenuated transmission level compared to a normal communication signal transmitted over the network; and c. upon having the hailing message being received at the failed slave node:

generates a reply message for transmission to the another slave node from the failed slave node, the reply message being transmitted at an attenuated level compared to the normal communication signal; and upon receiving a post-reply message at the master node from the another slave node, identifies the failed slave node from which the reply message originated, identifies the another slave node from which the post-reply message originated and updates the routing table to indicate that the failed slave node is capable of communicating through the another slave node.

* * * * *